Jan. 12, 1965 J. H. TROLL 3,165,045

DATA PROCESSING SYSTEM

Filed April 5, 1962 4 Sheets-Sheet 1

INVENTOR.
JOHN H. TROLL

BY

Blair & Buckles

ATTORNEYS

INVENTOR.
JOHN H. TROLL
BY
Blair & Buckles
ATTORNEYS

Jan. 12, 1965 J. H. TROLL 3,165,045

DATA PROCESSING SYSTEM

Filed April 5, 1962

4 Sheets-Sheet 3

INVENTOR.
JOHN H. TROLL

BY *Blair & Buckles*

ATTORNEYS

Jan. 12, 1965 J. H. TROLL 3,165,045

DATA PROCESSING SYSTEM

Filed April 5, 1962 4 Sheets-Sheet 4

INVENTOR.
JOHN H. TROLL

BY Blair & Buckles

ATTORNEYS

United States Patent Office 3,165,045
Patented Jan. 12, 1965

3,165,045
DATA PROCESSING SYSTEM
John H. Troll, New York, N.Y., assignor to Itek Corporation, Lexington, Mass., a corporation of Delaware
Filed Apr. 5, 1962, Ser. No. 185,316
11 Claims. (Cl. 95—4.5)

This invention relates to a novel electronic photo typesetter which photographically records and displays the information to be printed. More particularly, it relates to a photo typesetting system using a binary coded representation of the minute elements comprising the various characters to be printed. The coded characters are fed bit-by-bit into an optical read-out system which records each line element-by-element until the entire line has thus been recorded.

Photo typesetters are used primarily in composing materials for photo offset printing. They accomplish the same purposes as mechanical typesetters, except that each finished line is registered on a photo-sensitive medium instead of in the form of a stick of metallic type. Thus, a keyboard similar to a typewriter keyboard is operated to emit character symbols, generally of an electrical nature. In most prior photo typesetting systems, these signals position a beam of light relative to transparent characters on an opaque mask, and the characters are thus projected onto the photo-sensitive mediums. Prior to projection, justification is performed, i.e., the spaces between the words are substantially uniformly stretched, where needed, to make the length of each line conform to a standard value.

The above devices are generally fairly complex and costly. Also, in many cases, the speed of operation is limited by the rapidity of a mechanical start-stop motion of a character selection device, e.g., the opaque mask.

Accordingly, it is an object of my invention to provide an improved photo typesetting system.

A more specific object is to provide a photo typesetting system capable of high speed operation.

Another object of my invention is to provide a photo typesetting system of the above character which has a relatively simple construction and is quiet in operation.

Another object of my invention is to provide a photo typesetting system requiring relatively simple skill for its operation.

A further object is to provide a system of the above type which has a relatively small size and low cost and is therefore suitable for use even in small printing operations.

Yet another object of the invention is to provide a photo typesetter of the above character which is capable of operation with a large number of different type styles in a single unit.

Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawings, in which.

In general, my photo typesetter uses a reproduction system similar to that of a photo facsimile system. Thus, in essence, a modulated light beam sweeps over a light sensitive film in a series of thin lines. With a two-valued intensity for the beam, it is "on" whenever it passes over points to be covered by printed characters and "off" at points to be left blank. A number of sweeps of this nature, tracing out a plurality of such lines, results in the recording of an entire printed line on the photographic film. The number of sweeps used to form a printed line depends on the required resolution.

With a two-level beam intensity, the system readily lends itself to the use of a binary coding system for the various characters. A simple code, and the one I prefer to use, may be termed a "shape code." Each character is schematically divided into columns and rows of minute elements by a grid of vertical and horizontal lines, respectively. By way of example, each element may be given a binary One value if a portion of the character lies within it and a Zero value if it contains no part of the character. Then, by observing the values of the individual successive elements, running from left to right in the top row thereof and continuing with successive rows until the bottom row is reached, one may form a binary representation of the character. This is the shape code representation for that character.

It will be apparent that, if the shape code for a character is read into a photographic read-out system and the position of a light beam on the light sensitive medium is made to correspond to successive elements in the character, simple modulation of the light beam will register the character on the medium. In actual practice, the typesetter stores the shape codes for all the characters at known positions or addresses in a memory unit, and depression of a key on the keyboard causes emission of a signal therefrom corresponding to the address of the desired character. The shape code of the character is then read out from the memory and temporarily stored in a second memory along with preceding characters in the same printed line. Justification is then performed in a conventional manner, and the entire line is then processed by the optical read-out system. Preferably, this is done by first sweeping the light over a path corresponding to the top row of elements of the various characters and then over successive rows until the entire line has been recorded.

Figure 1:
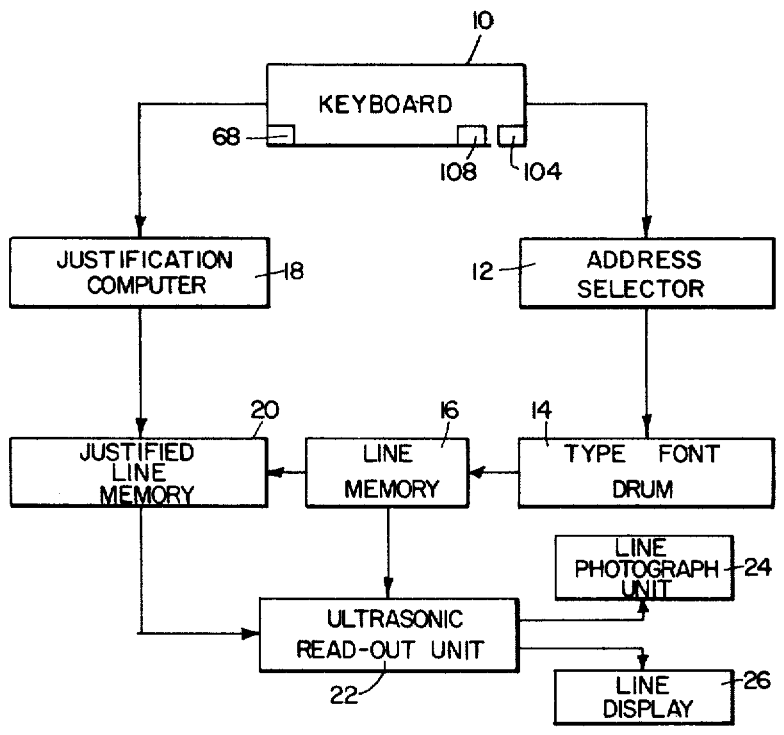
FIG. 1 is a schematic diagram of a photo typesetter embodying my invention.

Referring now to FIG. 1, my photo typesetter is seen to include a conventional keyboard indicated at 10, an address selector 12, and a type font in the form of a magnetic drum 14, which stores the various characters coded in magnetic form. Upon depression of a character key on the keyboard 10, the address selector 12 emits a binary signal corresponding to the address of the character on the drum 14, causing the latter to read out the character into a line memory 16. Successive characters are recorded in order on the memory 16, which may take the form of a magnetic drum with a line of recorded characters extending around the circumference thereof in a manner to be described.

The keyboard 10 also emits justification information in the form of a signal corresponding to the length of each character to be printed in a line and a second signal used to count the number of spaces between words in the line. This information is processed by a justification computer 18, and information from the justification computer is added to the lines stored in the memory 16 to generate justified lines which are stored in a memory 20, similar to the memory 16. The justified lines in the memory 20 are then precessed by an ultrasonic read-out unit 22 and recorded on light-sensitive film in a photograph unit 24. During typing of each line on the keyboard 10, the portion of the line stored in the memory 16 may be continuously read out through the unit 22 into a line display 26.

Figure 2:
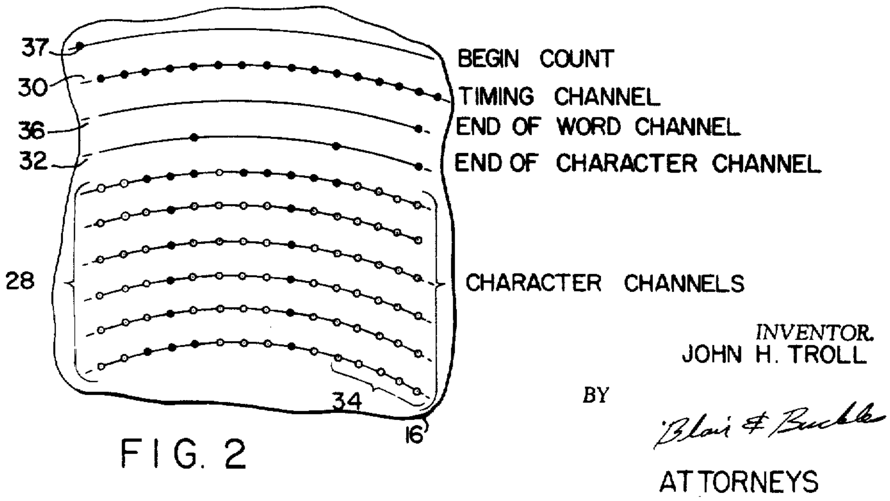
FIG. 2 is a schematic representation of the manner in which information is recorded in the magnetic memories used in the typesetter.

In FIG. 2 I have shown the manner in which the characters are recorded on the various drums, taking a portion of the line memory 16 as a model. Magnetization in one direction in a surface element of the drum is indicated by a dot, corresponding to a binary One, and magnetization in the the other direction is indicated by a circle, corresponding to a Zero. Each One corresponds to a portion of the printed output in which printing will take place, and each Zero corresponds to a portion left blank. An example is the recording of the letters I and T in character channels 28. The number of character channels will, of course, ordinarily be considerably greater than that shown, so as to provide sufficient resolution for the system.

In addition to the character channels, there is a timing channel 30 which has a One for each column (horizontal in FIG. 2) of elements and an end-of-character channel 32 which has a One at the end of each character. For the purpose of the following description, a space between words is assumed to be a character, as shown by the space indicated at 34 on the memory 16. There is also an end-of-word channel 36, which has a One at the end of each word, each word including the space character at the end thereof. Additionally, the drum 16 includes a "begin count" channel 37 having a single One to indicate where counting of the timing channel markers is to begin and thus serving as an index mark on the drum.

The various memories, drums, etc., described hereinafter are assumed to include suitable conventional read-in and read-out equipment including amplifiers, reading and writing heads and switching circuits, and therefore details of this nature are not included in the following description.

Figure 3:
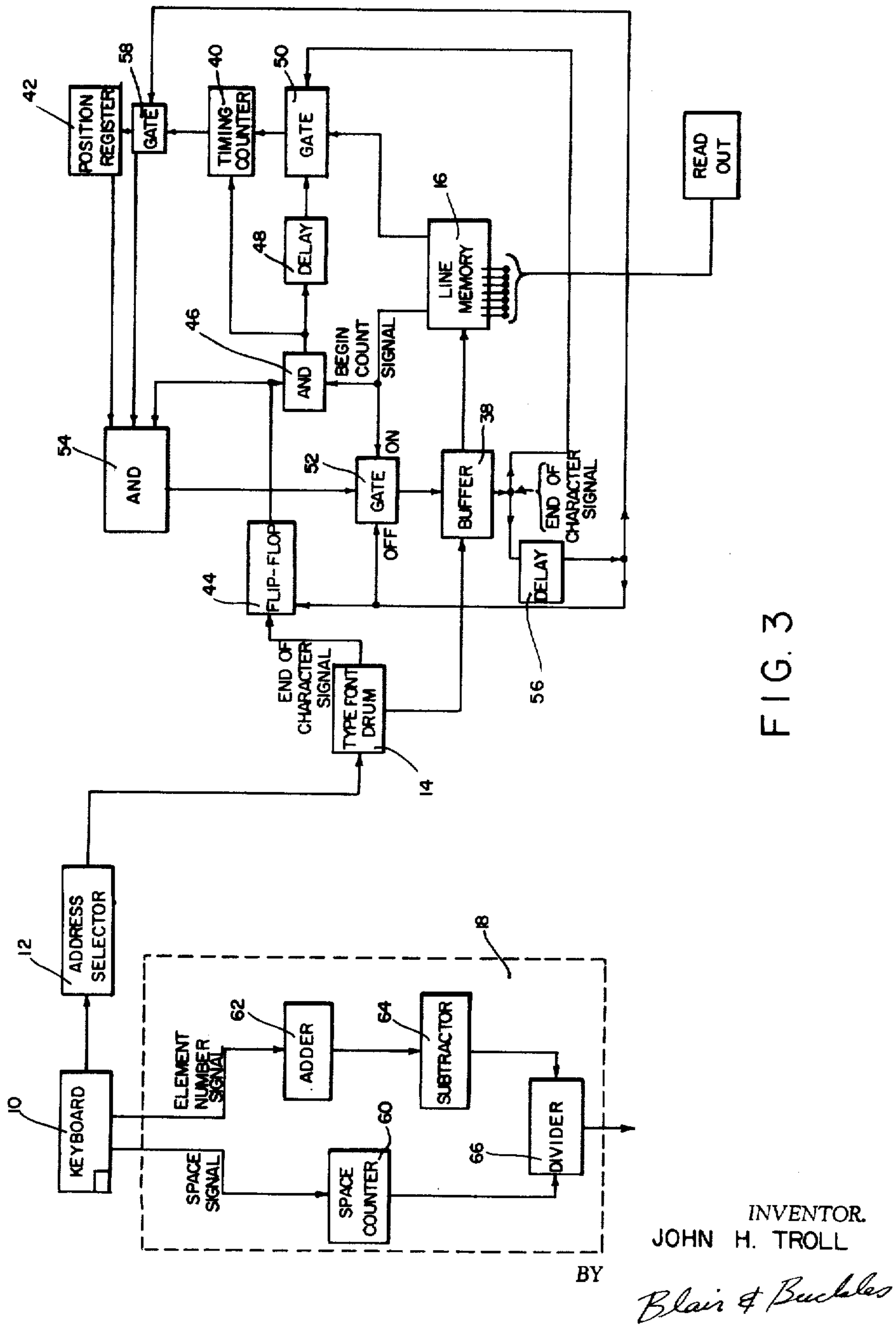
FIG. 3 is a schematic diagram of the system used to transfer characters from the type font to a line memory.

Referring now to FIG. 3, all of the characters which may be printed are recorded on the type font drum 14, and the addresses of the various characters on the drum are recorded in the address selector 12. In its simplest form, the selector 12 is a matrix type encoder which converts an input on a single line for each character into output voltages on selected output lines corresponding to the address of the character. Alternatively, the matrix can be built into the keyboard itself. The individual characters are read from the drum 14 into the line memory 16 by way of a buffer 38, which illustratively may take the form of a small magnetic core memory. The manner in which this is accomplished is as follows.

First, a key on the keyboard 10 corresponding to the first character in the line is depressed, and the character is read out from the drum 14 into the buffer 38. The end-of-character pulse from the drum 14 sets a flip-flop 44 and also inhibits further read-out from the drum. Setting of the flip-flop enables an AND circuit 46. The next begin-count pulse from the memory 16 is passed by the AND circuit 46 directly to a timing counter 40 to clear the latter, and, by way of a delay element 48, it is applied to the "on" input of a latching gate 50. The gate 50 is assumed to include a flip-flop which maintains the gate "on" after the "on" input is actuated and then maintains it off after an "off" input is actuated.

With the gate 50 "on," the counter 40 is connected to count the timing pulses from the memory 16. The begin-count pulse is also applied to the "on" input of latching gate 52 connected to pass the output of an AND circuit 54. With the gate 52 on, the AND circuit 54 transmits a signal to initiate unloading of the buffer 38 into the memory 16 as soon as the contents of the counter 40 are the same as that of a previously cleared position register 42. This occurs immediately, since both are in the cleared state. Operation of the buffer 38 is, of course, synchronized with the drum 14 or memory 16, as the case may be, by the use of the timing pulses from the two drums.

When the character has been read into the line memory, the end-of-character pulse from the buffer 38 turns off the gate 50 to stop the count of timing pulses, and, after a slight delay interposed by a delay element 56, it momentarily turns on a gate 58 to transfer the contents of the counter 40 to the register 42. The delayed end-of-character pulse is also used to reset the flip-flop 44 and turn off the gate 52.

The above operation occurs in a small fraction of a second, e.g., of the order of 0.01 second, and, therefore, the system is almost immediately ready for depression of the next character key on the keyboard 10. When this occurs, operation will be as described above, except that read-out of the buffer 38 into the memory 16 will not occur until the end of the first character recorded on the line memory passes the read-in heads (not shown), since the count in the timing counter 40 will not equal the stored content of the register 42 until the memory reaches that position. It should be kept in mind that each space character carries with it an end-of-word phase in the channel 36 (FIG. 2), as pointed out above.

With further reference to FIG. 3, the justification computer 18 includes a space counter 60 which receives a pulse from the keyboard 10 each time the space bar thereon is depressed. A line width adder 62 receives from the keyboard 10, and adds together, the widths of the various characters in terms of the number of columns of elements thereof. The count in the adder 62 is subtracted from the line width by a subtracter 64, and the output of the subtracter is divided by the total in the space counter 60 by a divider 66, to determine the number of elements which must be added to each space character to justify the line. The divider contains a quotient and remainder, which are used in justification in a manner presently to be described.

Figure 4:
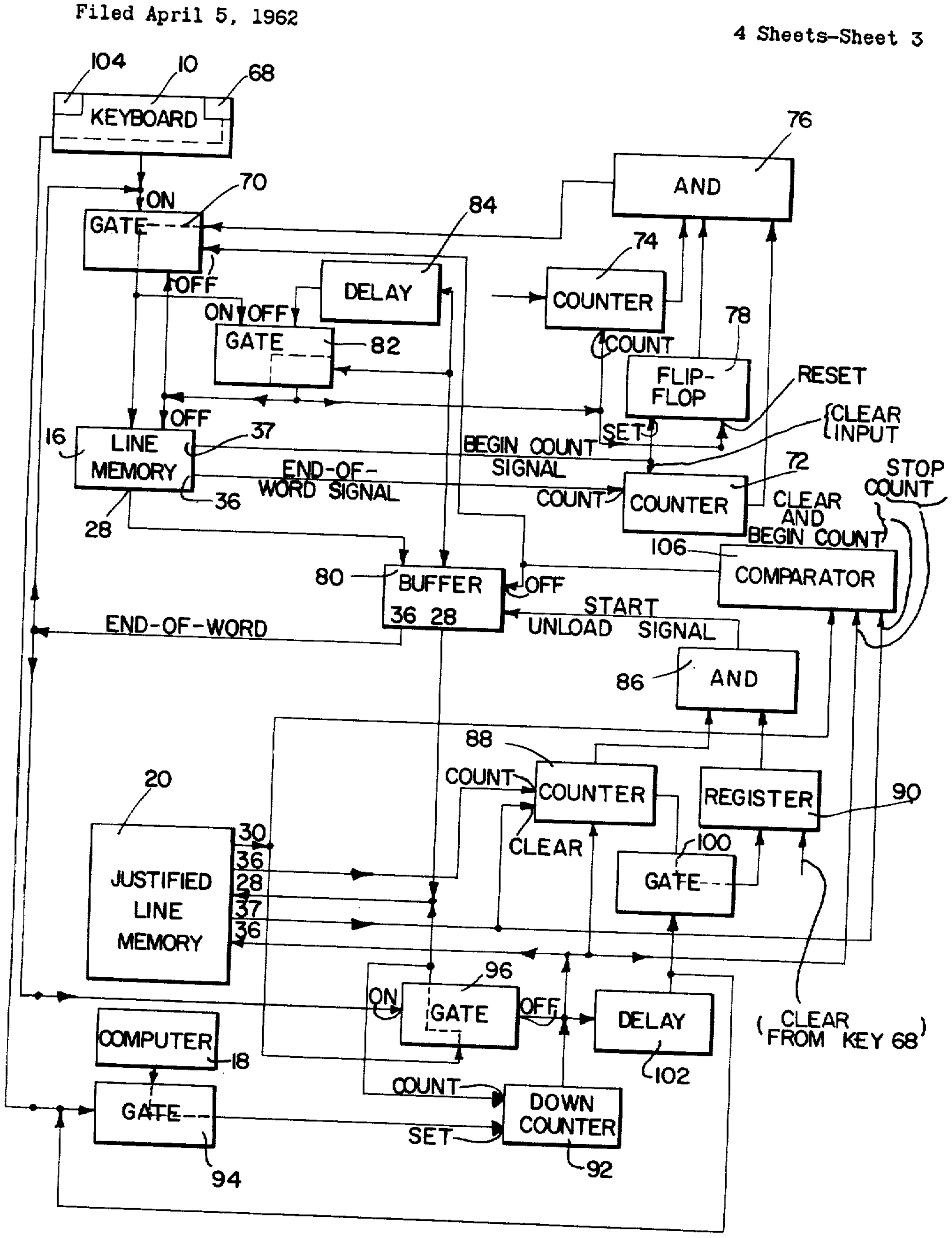
FIG. 4 is a schematic diagram of the system used to justify a line.

Referring now to FIG. 4, when the line has been keyboarded, the operator presses a justification key 68 which emits a pulse to the "on" input of a latching gate 70. Counters 72 and 74, which have been cleared, are connected to the input of an AND circuit 76, and, when a flip-flop 78 is set by the next begin-count pulse, a signal from the AND circuit 76 is passed by the gate 70 to the memory 16 to initate read-out of the first word into a buffer 80. The AND circuit signal also turns on a gate 82. The end-of-word pulse at the end of the word is then passed by the gate 82 to be added into the counter 74. The output of the gate 82 is also applied to an "off" input of the gate 70, as well as the reset input of the flip-flop 78. After a slight delay in a delay element 84, the end-of-word pulse also turns off the gate 82. The begin-count pulses continually clear the counter 72 to start its counting again at the beginning of each revolution of the memory 16.

Once the buffer 80 has been loaded with a word, it begins unloading into a drum in the justified line memory 20 upon receipt of a start-unload signal from an AND circuit 86. More specifically, one input to the circuit 86 is the content of a counter 88 connected to count the end-of-word pulses from the memory 20, the counter 88 being continually cleared by begin-count pulses from the channel 37 in this memory. The other input to the AND circuit 86 is from a register 90, which may be cleared at the beginning of the justification process by depression of the key 68. Thus, when the buffer 80 has been loaded, the next begin-count pulse brings about coincidence of the contents of the counter 88 and register 90 and the buffer begins to unload into the memory 20.

In the meantime, the output of the computer 18 has been read into a down counter 92 by way of a gate 94 momentarily actuated by the signal from the key 68. When the word stored in the buffer 80 has been read into the memory 20, the end-of-word pulse from the buffer turns on a latching gate 96 to pass timing pulses to the channels 28 and thereby add extra elements to the space character at the end of the word; the gate 96 also passes the timing pulses to the down counter 92. When the down counter has counted down to zero, the number of elements added to the space character is equal to the number required for justification as indicated by the computer 18, and a zero signal from the down counter turns off the gate 96. The same signal records a One in the end-of-word channel 36 at this point, and, also, it adds a One to the count in the counter 88.

The Zero output signal from the down counter 92 is also passed through a delay element 102 before momentarily opening the gate 94 to pass the amount of the next space character increment from the computer 18 to the down counter. The delayed signal also momentarily turns on a gate 100 to record the timing count in the register 90.

Since there is generally a remainder as well as a quotient at the output of the divider 66 (FIG. 3) in the computer 18, the computer is programmed to deliver to the down counter 92, each time the gate 94 is opened, the quotient plus one unit. This is repeated until the remainder is exhausted, and thereafter only the quotient is delivered to the down counter. There are, of course, many ways of accomplishing this function. For example, the remainder might be stored in a further down counter (not shown) and a One added to the quotient as long as any content remains therein. This down counter would be connected to count down each time a signal is applied to the gate 94.

In the meantime, the end-of-word signal from the buffer 80 has once again turned on the gate 70. The content of the counter 72 will coincide with that of the counter 74 after one end-of-word pulse, i.e., at the beginning of the second word, and the second word in the line will therefore be loaded into the buffer in the manner described above. After the buffer has been loaded, it will begin unloading into the memory 20 when the timing count in the counter 88 coincides with the content of the register 90, i.e., at the end of the first word, including the justified space character at the end thereof. The process continues until the entire line has been justified and loaded into the memory 20.

With further reference to FIG. 4, a comparator 106 stores the number of elements, i.e., timing pulses, in a fully justified line, and it compares this number with the content of a counter therein (not shown) which counts timing pulses from the memory 20. The counter is cleared and counting is initiated by the begin-count pulses. Counting is stopped by the Zero signals from the down counter 92. When the count in the comparator counter equals the number of stored pulses, an output signal from the comparator 106 turns off the gate 70 and maintains it in that condition until the key 68 is again depressed. The comparator may, by way of example, comprise a fixed register containing the required count and a coincidence circuit for comparing the content of its counter with that of the fixed register. The output of the comparator 106 also turns off the buffer 80, i.e., stops the unloading operation thereof.

Returning to FIG. 1, the operator may view the justified line on the display 26, the display having been switched to the output of the memory 20 by depression of the justification key 68, by means of circuitry not shown in the drawings. If the justified line is satisfactory, the operator may depress a key 108 on the keyboard 10 to clear the memory 16 and the various registers, etc. associated therewith. The clear signal may also be developed by the memory 20. In either case, it is also used to switch the input of the memory 20 to a second set of channels 28 and 36. A second justified line may then be recorded in the memory 20 next to the first line and the process may be continued until a full page, for example, is stored in this memory. When this has been accomplished, the operator depresses a print key 104 to cause the line to be photographed.

Figures 5, 5A:
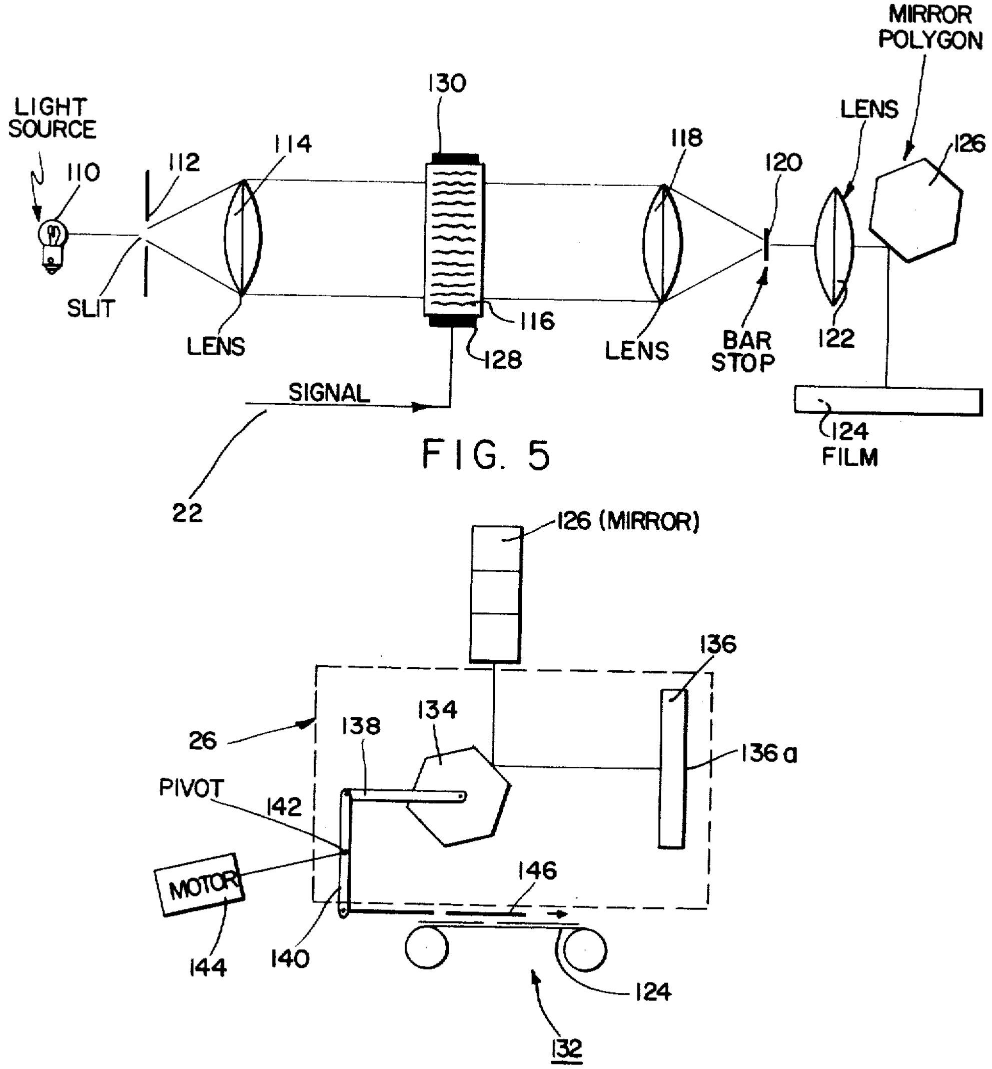
FIGS. 5 and 5*a* depict the optical read-out system used in the system of FIG. 1.

More specifically, as seen in FIG. 5, the ultrasonic read-out unit 22 includes a light source 110, a slit 112, a collimating lens 114, a diffraction cell 116 and a second lens 118 which forms an image of the slit 112 on a bar stop 120. A lens 122 focuses an image of the cell 116 on a photographic film 124 by way of a rotating polygonal mirror 126.

The cell 116 is filled with a transparent liquid, and, at its lower end, it is provided with an ultrasonic transducer 128 such as a piezoelectric crystal. At the upper end of the cell is an acoustical absorber 130 which prevents reflections of acoustical energy generated by the transducer 128. The bar stop 120 is just larger than the image of the slit 112 therein, and, therefore, light does not ordinarily pass the stop. However, if the transducer 128 is activated, an acoustical wave passing through the liquid will cause diffraction of the light passing through the cell 114. This light will pass around the bar stop and thus be projected to the film 124.

Actuation of the print key 104 (FIG. 1) initially causes readout of the top most channel 28 (FIG. 2) in the first line of characters in the memory 20, read-out resulting in modulation of the output of a high frequency generator (not shown) whose output is connected to the transducer 128. Modulation is such that, for each One read out of the memory 20, a finite level of energy is applied to the transducer, and for each Zero the level is Zero.

Thus, a train of short bursts of high frequency energy passes upwardly in the cell 116 from the transducer 128 to the absorber 130. This train of pulses is imaged on a film 124, and, if the mirror 126 were stationary, each burst, corresponding to a One in the shape code, would result in an element of light travelling along the film. However, rotation of the mirror 126 "stops" movement of the light elements, so that as each One travels along the cell 116 it remains fixed to the same point on the film. The rotational velocity of the mirror 126 thus corresponds to the velocity of sound in the cell 116, and the number of sides on the polygon is such as to lay down one channel 28 from the memory 20 on the film 124 during the time each face **126*a* is in position to reflect light from the lens 122 to the film. The magnetic drum in the memory 20 is synchronized with the motion of the mirror 126** in order to accomplish this row-at-a-time printing.

The film 124 is mounted on a suitable transport mechanism indicated generally, in FIG. 5*a*, at 132, which commences to index the film slowly under the mirror when printing begins, and, in this manner, successive rows of elements in the printed line and succeeding lines are laid down until the entire page has been registered on the film 124. At the end of each line, the memory 20 may develop an end-of-line signal (e.g., by means of a magnetic indication at the end of the recorded line on the magnetic drum) which speeds up the indexing action for line spacing and switches read-out to the next recorded line.

While I prefer to use the illustrated form of ultrasonic readout units, other units of this type may also be used. For example, the system shown in FIG. 4 of U.S. Patent No. 2,155,660 might be used to advantage. In another modification, the rotation of the mirror 126 may be avoided by using a strobe light for the source 110, with the quick flash of the strobe light "stopping" the light elements emanating from the cell 116. If a system of this type is used, it is, of course, preferable that the cell 116 be large enough to accommodate an entire row of elements of the printed line.

As seen in FIG. 5*a*, the line display 26 may include a second polygonal mirror 134 disposed to reflect the light from the mirror 126 onto a ground glass plate 136. The mirror 134 serves the same purpose as movement of the film 124 in FIG. 4. That is, it moves the beam of light from the mirror 126 in the vertical direction (FIG. 5*a*) so as to display the rows of elements in a printed line in succession and thereby form a display of the entire line which may be viewed from the surface 136a of the plate.

The mirror 134 may be mounted on an arm 138 conenected to a second arm 140 pivoted at 142 for limited rotation by a motor 144. The other end of the arm 140 is connected to a shutter 146. Thus, activation of the motor 144 in response to depression of the key 104 on the keyboard 10 (FIG. 1) causes movement of the mirror 134 to the left (FIG. 5*a*) and corresponding movement of the shutter 146 to the right. This provides for projection of the light from the mirror 126 onto the film 124.

It will be apparent that, after a page has been recorded on the film, the memory 20 may develop an appropriate signal activating the motor 124 to return the mirror 134 to its position for visual display.

The above system readily lends itself to page correction procedure which can be accomplished as follows. First the page is printed on a sheet instantly developable for proofreading. After page proofing is completed, each line that contains an error is erased from the memory 20 and is then reset in the memory by re-recording the correct information. The final offset plate is then printed from the corrected magnetic record.

It will be apparent that many modifications may be made in the circuits described above, particularly those shown specifically in FIGS. 3 and 4. For example, while the line memory, justified line memory, and type font have been shown as separate units for ease of illustration, a single drum may be used for all three units. Similarly, a single buffer may be used for both loading and unloading the line memory 16. Additionally, many of the circuit elements associated with the loading and unloading processes may serve double duty in loading the memory 16 and the memory 20. Furthermore, other short term storage systems than magnetic drums and tapes fall within the purview of the present invention.

In some cases it may be desirable to photograph each line after it has been keyboarded, rather than wait for a whole page to be recorded. In that case, the buffer 38 can be combined with the justification computer 18 to transfer information directly to the read-out unit, thus eliminating the buffer 80 and memories 16 and 20. In this case the buffer 38 should have a storage capacity of one full line. The keyboard characters are stored in successive addresses in the buffer, an operation easily accomplished in a magnetic core memory.

In another variation of the system, the capacity of the buffer 80 may be reduced to a single character content, although with some decrease in operating speed. Each line is then transferred from the memory 16 to the memory 20 character-by-character instead of word-by-word. Modifications in the above-described circuits for operation in this manner will be apparent.

In yet another modification of the present system, the line memory can be eliminated by replacing it with a programming unit which selects the proper letter shape portion from the shape code drum in accordance with the line requirements. The same system can also be adapted for use with other type displays, e.g., cathode ray tubes.

Still other variations within the scope of my invention will be apparent to those skilled in the art. The embodiment used in any instance will depend on such factors as the particular application, relative cost and required speed of operation.

It will thus be seen that the objects set forth above, among those made apparent from the proceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. Photo typsetting apparatus comprising, in combination, a magnetic type font first storage medium storing the characters in the form of a binary representation indicating which elements of the characters are to be printed, means for reading from said first medium a line comprising selected ones of said characters, means for justifying said line and recording it on a second magnetic storage medium, and output means for reading the justified line from said second medium and recording it on a light sensitive medium, said output means being arranged to record said line element-by-element.

2. The combination defined in claim 1 in which said output means projects light on successive elements of said medium, said light having a first intensity for elements to be printed and a second intensity for elements not to be printed.

3. The combination defined in claim 1 including means for arranging said line on said second medium in the form of rows of elements, said rows extending along said line, each of said elements on said medium being a quantity having a first value if the element corresponds to a printed portion of the line and a second value if the element corresponds to a portion of the line not to be printed, said output means being arranged to illuminate successive portions of said sensitive medium corresponding to elements on said second medium in element-by-element and row-by-row sequence, the illumination of said sensitive mediums having a third value corresponding to said first value and a fourth value corresponding to said second value.

4. Photo typsetting apparatus comprising, in combination, a type font comprising a first magnetic memory storing the characters in the form of rows of elements corresponding to rows of elements of the printed characters, each element in said first memory having a first magnetization if it is to be printed and a second magnetization if it is not to be printed, a second magnetic memory, means for reading said rows of elements from said type font into said second unit to form a line of said characters in said second unit, a third magnetic memory, means for transferring said line of characters from said second memory to said third memory and justifying said line to form a justified line in said third memory, and output means for projecting light on a photographic medium to record said justified line thereon, said output means being arranged to project light on said photographic medium element-by-element and row-by-row of the printed line, the intensity of light at each element on the photographic medium having a first value for said first magnetization and a second value for said second magnetization.

5. The combination defined in claim 4 including means for transferring said line from said second memory to said third memory in a parallel process word-by-word with said rows of each word being transferred simultaneously.

6. The combination defined in claim 5 including justifying means for adding an appropriate increment to each space character after the corresponding word has been transferred to said third memory.

7. The combination defined in claim 4 including a visual output medium positioned to receive the light projected by said output means whereby the justified line may be visually observed before recording on said photographic medium.

8. The combination defined in claim 7 including means connecting said output means to said second memory for visual display on said visual medium of the portions of the line recorded in said second memory, said output means including means for alternately projecting said light on said visual medium and said photographic medium.

9. Photo typsetting apparatus comprising, in combination, a type font in the form of a first magnetic memory in which the characters are recorded in rows of elements corresponding to rows of elements of the printed characters, each of said elements in said first memory having a first magnetization if the element corresponds to a printed element and a second magnetization if it corresponds to an unprinted element, a keyboard for selecting characters from said font, a second memory, means for transferring from said font to said second memory characters selected by means of said keyboard, said transferring means transferring simultaneously the rows of elements of the selected characters and recording said characters in said second memory in successive positions thereof to form a line of characters, a third memory, second transferring means operable by said keyboard to transfer said line of characters from said second memory to said third memory a word at a time with the rows of each of said words being transferred simultaneously, justifying means for adding a space increment at the end of each word after it has been transferred to said third memory, output means for displaying the magnetically recorded lines alternately from said second and third memories and alternately on visual and light sensitive output media on command from said keyboard, said output means being adapted to project light on said media element-by-element and row-by-row corresponding to the elements recorded in said second and third memories with the light having a first intensity for elements on said output media corresponding to elements having said first magnetization and a second intensity for elements on said light sensitive media corresponding to elements having said second magnetization.

10. The combination defined in claim 9 in which said memories are revolving magnetic media and including a first buffer between said font and said second memory and a second buffer between said second memory and said third memory, said buffers being connected to momentarily store the information transferred between said first and second memories.

11. The combination defined in claim 9 in which said output means includes an ultrasonic read-out unit of the type having a diffraction cell activated by bursts of ultrasonic energy, means for passing a light beam through said cell and means for imaging said cell on said output media.

References Cited by the Examiner

UNITED STATES PATENTS

| | | | |
|---|---|---|---|
| 2,429,787 | 10/47 | Young | 178—5 |
| 2,624,798 | 1/53 | Dinga | 95—4.5 X |
| 2,714,843 | 8/55 | Hooven | 95—4.5 |
| 2,787,654 | 4/57 | Peery | 95—4.5 X |

NORTON ANSHER, *Primary Examiner.*

JOHN M. HORAN, *Examiner.*